United States Patent
Nakamura (10) Patent No.: US 10,710,643 B2
(45) Date of Patent: Jul. 14, 2020

(54) VEHICLE REAR STRUCTURE

(71) Applicant: TOYOTA JIDOSHA KABUSHIKI KAISHA, Toyota-shi (JP)

(72) Inventor: Takuya Nakamura, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 193 days.

(21) Appl. No.: 15/952,283

(22) Filed: Apr. 13, 2018

(65) Prior Publication Data

US 2018/0304935 A1 Oct. 25, 2018

(30) Foreign Application Priority Data

Apr. 24, 2017 (JP) ................... 2017-085410

(51) Int. Cl.
*B62D 25/08* (2006.01)
*B62D 25/20* (2006.01)
*B62D 43/10* (2006.01)

(52) U.S. Cl.
CPC ........... *B62D 25/087* (2013.01); *B62D 25/08* (2013.01); *B62D 25/20* (2013.01); *B62D 43/10* (2013.01)

(58) Field of Classification Search
CPC ...... B62D 25/20; B62D 25/087; B62D 25/08; B62D 43/10
USPC .................................................. 296/203.04
See application file for complete search history.

(56) References Cited

U.S. PATENT DOCUMENTS

| 6,007,145 A | 12/1999 | Tezuka |
| 2006/0214414 A1* | 9/2006 | Wehner ............... B62D 21/152 280/784 |
| 2010/0225135 A1 | 9/2010 | Taneda |
| 2015/0175212 A1 | 1/2015 | Heo |

FOREIGN PATENT DOCUMENTS

| DE | 1 119 682 B | 12/1961 |
| DE | 10 2008 026 334 A1 | 12/2009 |
| DE | 10 2014 116 118 A1 | 6/2015 |
| GB | 752506 A | 7/1956 |
| JP | 2006-218989 | 8/2006 |
| JP | 2012-224190 | 11/2012 |
| JP | 2014-113922 | 6/2014 |
| JP | 2014113922 A * | 6/2014 |

* cited by examiner

*Primary Examiner* — Joseph D. Pape
*Assistant Examiner* — Dana D Ivey
(74) *Attorney, Agent, or Firm* — Oblon, McClelland, Maier & Neustadt, L.L.P.

(57) ABSTRACT

A vehicle rear structure includes rear side members, a lower back panel, and a rear floor panel. The lower back panel includes a wall plate panel, and is joined to the rear side members. The rear floor panel includes a joint flange, joint portions, and coupling plate portions. A rear end of a central portion of the rear floor panel in a vehicle width direction is provided behind, in a vehicle front-rear direction, rear ends of both of side portions of the rear floor panel in the vehicle width direction. A bent portion that is projected toward a front side of the vehicle is formed by the joint flange and each of the coupling plate portions.

4 Claims, 9 Drawing Sheets

VEHICLE REAR STRUCTURE

INCORPORATION BY REFERENCE

The disclosure of Japanese Patent Application No. 2017-085410 filed on Apr. 24, 2017 including the specification, drawings and abstract is incorporated herein by reference in its entirety.

BACKGROUND

1. Technical Field

The disclosure relates to a vehicle rear structure.

2. Description of Related Art

Figure 7:
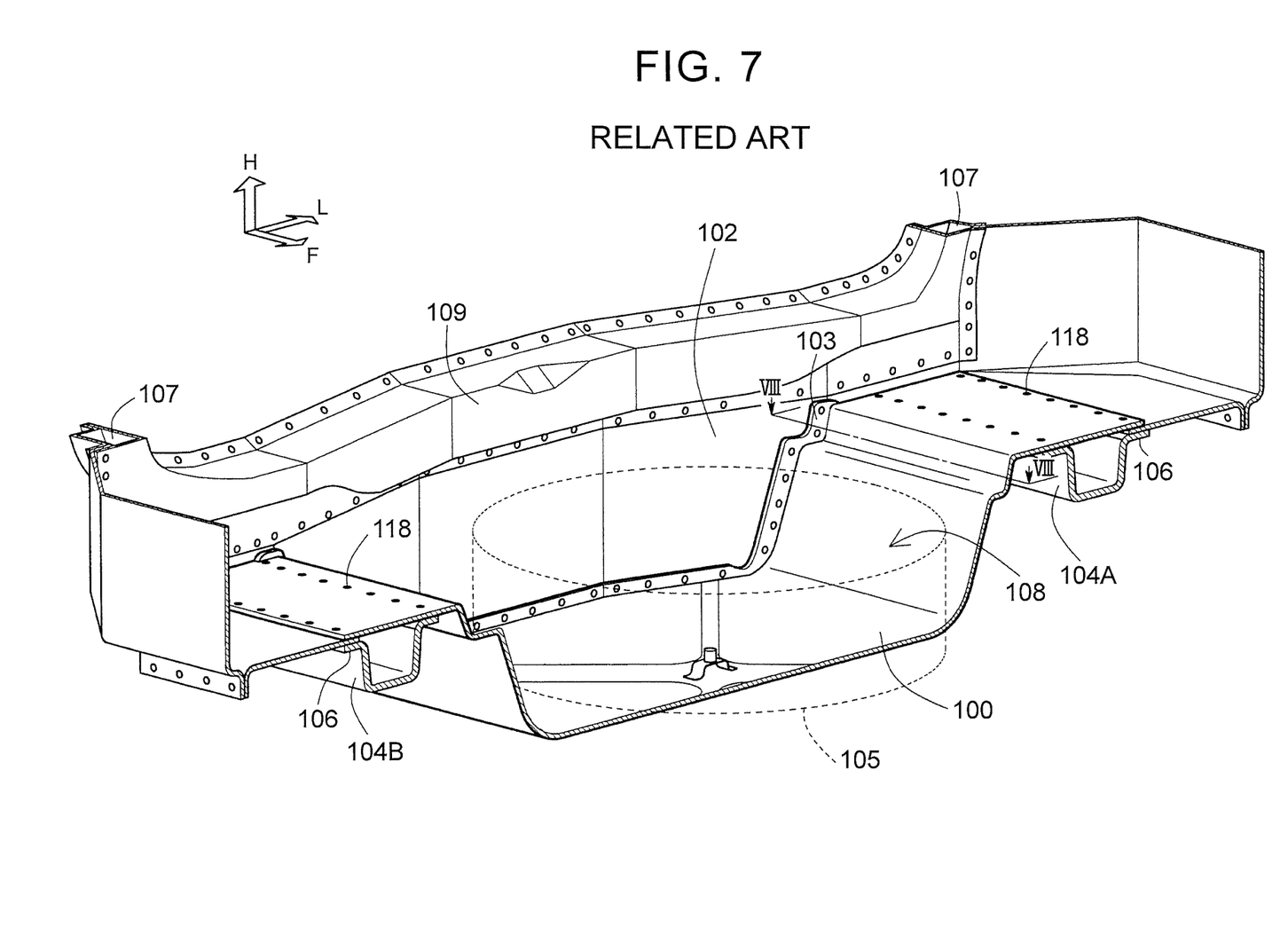
FIG. 7 is a perspective view that shows a vehicle rear structure according to related art.

As shown in FIG. 7, components of a vehicle rear structure include a rear floor panel 100, a lower back panel 102, and rear side members 104A, 104B.

The rear floor panel 100 is a floor plate member in a rear portion of a vehicle and is disposed in a substantially horizontal manner (on an LF plane in FIG. 7). The lower back panel 102 is a rear wall member of the vehicle and is disposed so as to extend in a substantially vertical manner (on an HL plane in FIG. 7). In addition, the lower back panel 102 is provided with a lower back reinforcement 109 (hereinafter appropriately described as a lower back R/F) and a D pillar 107 that are frame members extending in a vehicle width direction. Each of the rear side members 104A, 104B is a frame member that extends along a vehicle front-rear direction (an F-axis direction in FIG. 7).

A recess 108 that accommodates a spare tire 105 is formed in a portion of the rear floor panel 100 that is disposed between the rear side members 104A, 104B. In order to conform to a diameter of the spare tire 105, a central portion of each of the rear floor panel 100 and the lower back panel 102 in the vehicle width direction has a projected shape toward the rear side of the vehicle as compared to both of side portions thereof.

As shown in FIG. 7, a joint flange 103 that follows the shape of the lower back panel 102 is provided at a rear end (an end in an F-axis negative direction) of the rear floor panel 100. When the joint flange 103 and a lower end of the lower back panel 102 are caused to contact each other and are joined to each other by spot welding, laser screw welding, or the like, the rear floor panel 100 and the lower back panel 102 are joined to each other.

An HL sectional shape of each of the rear side members 104A, 104B in FIG. 7 is a hat shape, and joint flanges 106 that correspond to a brim of each of the rear side members 104A, 104B and the rear floor panel 100 are joined to each other by spot welding, laser screw welding, or the like. A similar structure is also disclosed in Japanese Patent Application Publication No. 2006-218989 (JP 2006-218989 A), for example.

Figure 8:
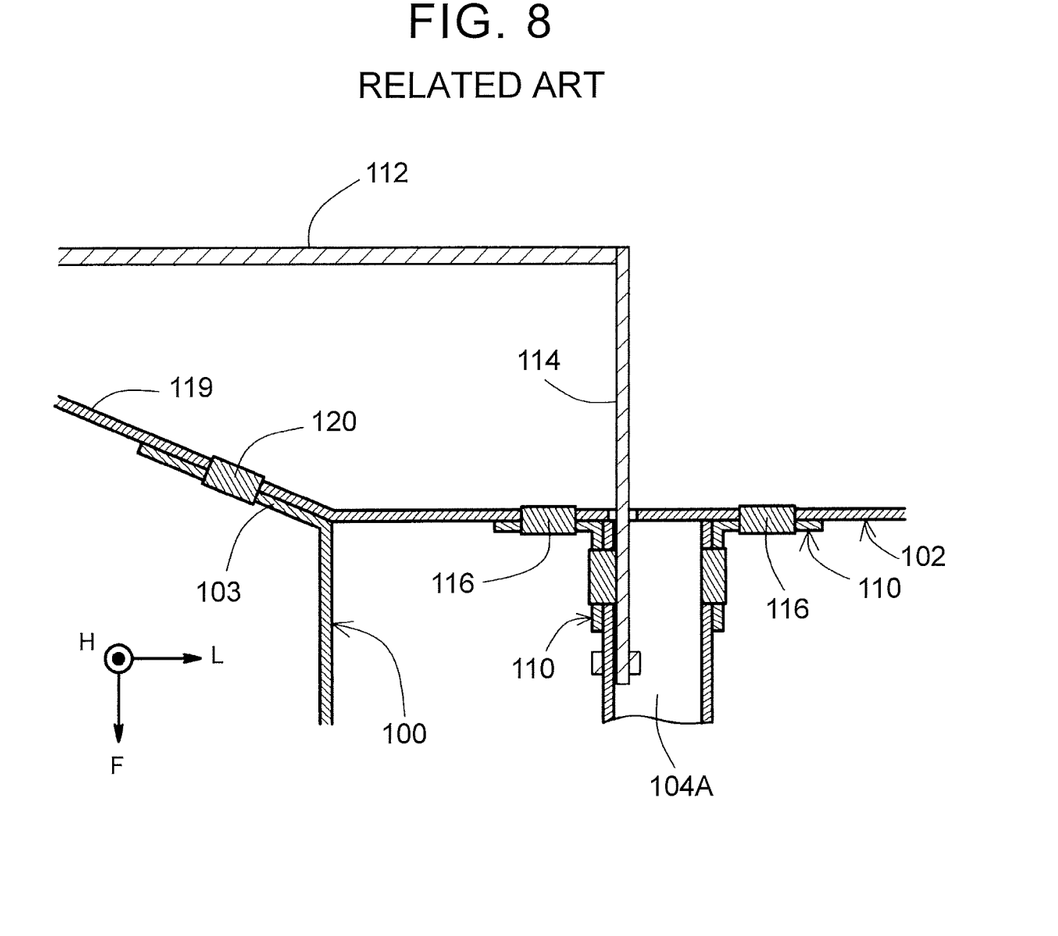
FIG. 8 is a sectional view that is taken along line VIII-VIII in FIG. 7.

FIG. 8 shows a section that is taken along line VIII-VIII in FIG. 7. As shown in this drawing, a rear end of the rear side member 104A (, 104B) contacts the lower back panel 102. Furthermore, a bracket 110 is joined to the rear side member 104A (, 104B) and the lower back panel 102 by spot welding, laser screw welding, or the like. In this way, the rear side member 104A (, 104B) and the lower back panel 102 are fixed to each other (via the bracket 110).

A towing hitch member 114 of a towing hitch 112 can be coupled to each of the rear side members 104A, 104B, and the towing hitch 112 is a coupling device used to tow a trailer. A load is applied to the rear side members 104A, 104B when the trailer is towed. For example, when the vehicle starts on an uphill gradient, the load in a direction opposite to an advancing direction (a backward direction) is applied from the towing hitch 112 to the rear side members 104A, 104B. When the vehicle stops on a downhill gradient, the load in the advancing direction (a forward direction) is applied from the towing hitch 112 to the rear side members 104A, 104B.

Figure 9:
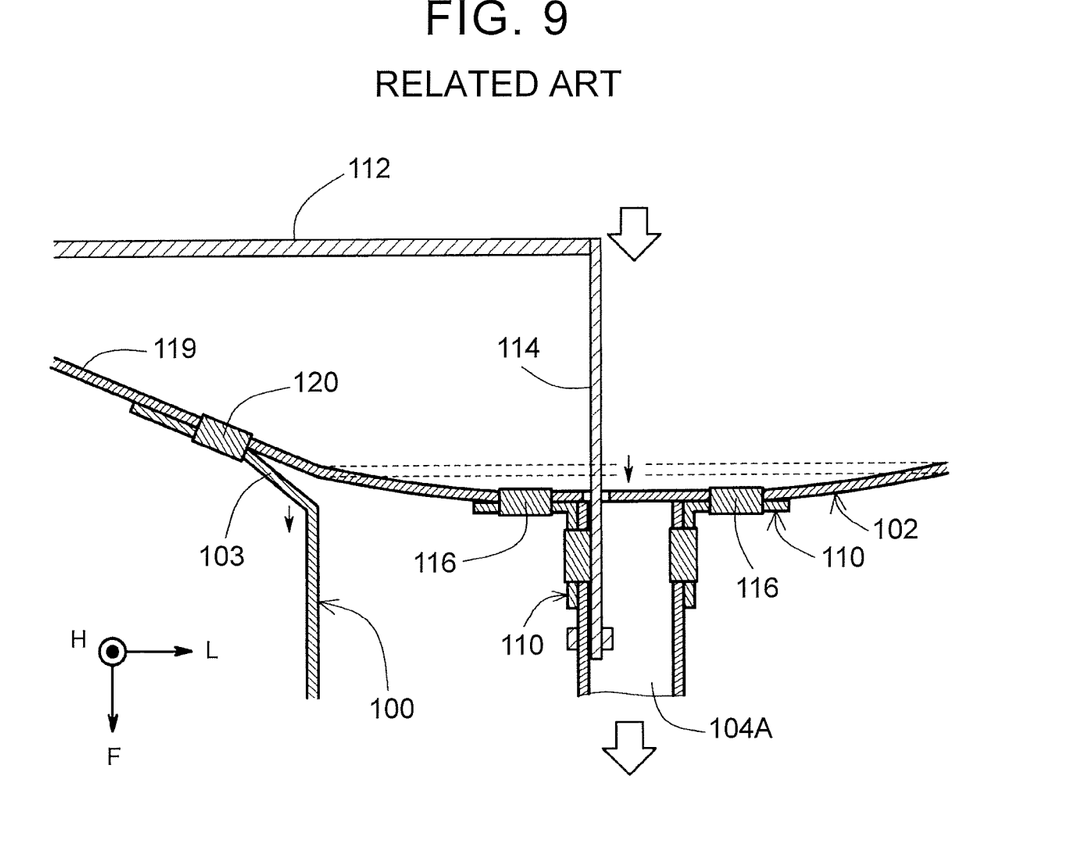
FIG. 9 is a view that shows behavior of peripheral members at a time when a rear side member receives the load in FIG. 8.

When the load is applied to the rear side members 104A, 104B, the rear side members 104A, 104B are displaced. As shown in FIG. 9, when the rear side member 104A receives the load in a vehicle forward direction, the rear side member 104A is displaced toward the front side of the vehicle.

At this time, the load is also applied to members that are joined to each of the rear side members 104A, 104B. For example, a portion of the lower back panel 102 around a joint point 116 joined to the bracket 110 is subjected to flexural deformation toward the front side of the vehicle. In addition, in the rear floor panel 100, a joint point 118 (see FIG. 7) and the joint flange 103 near the joint point 118 are displaced toward the front side of the vehicle.

Here, since the lower back panel 102 is provided with the lower back R/F 109 and the D pillar 107 as the frame members, displacement (a deformation amount) of the lower back panel 102 is smaller than displacement of the rear floor panel 100. Due to a difference in the displacement therebetween, as shown in FIG. 9, a connecting portion 119 of the lower back panel 102 and the joint flange 103 are displaced relative to each other. As a result, a tensile load is applied to a joint point 120 of the joint flange 103. Accordingly, the joint point 120 of the joint flange 103 may be separated from the connecting portion 119.

In view of the above, for example, in Japanese Patent Application Publication No. 2014-113922 (JP 2014-113922 A), a lower back extension as a reinforcing member is provided in some of the joint points between the lower back panel and the rear floor panel.

SUMMARY

Since the reinforcing member is provided, component cost and processing cost increase.

The disclosure provides a vehicle rear structure that makes it possible to reduce a load applied to a joint point between a lower back panel and a rear floor panel such that the load is smaller than that in a conventional vehicle rear structure, without adding a reinforcing member.

A first aspect of the disclosure relates to a vehicle rear structure. The vehicle rear structure includes rear side members, a lower back panel, and a rear floor panel. The rear side members extend in a vehicle front-rear direction and are configured such that a towing hitch member is coupled to rear ends of the rear side members. The lower back panel includes a wall plate panel, and is joined to the rear side members. The wall plate panel is erected and is configured such that a frame member extending in a vehicle width direction is disposed on the wall plate panel. The rear floor panel has a rear end in a shape extending along the wall plate panel. The rear floor panel includes a joint flange that is erected at the rear end of the rear floor panel and includes a joint point joined to the wall plate panel, joint portions each of which includes a joint point joined to a corresponding one of the rear side members, and coupling plate portions each of which is provided between the joint flange and a corresponding one of the joint portions so as to couple the joint flange to the joint portion. A rear end of a central portion of the rear floor panel in the vehicle width direction is provided behind, in the vehicle front-rear direction, rear ends of both of side portions of the rear floor panel in the vehicle width direction. A connecting portion is provided between the central portion of the rear floor panel and each of the side portions of the rear floor panel such that a rear end of the connecting portion is tilted in a plan view so as to connect the central portion and the side portion. The joint flange is provided to extend along the rear ends of the central portion and the connecting portion. Each of the coupling plate portions is provided to extend along the rear end of a corresponding one of the side portions, and a bent portion that is projected toward a front side of the vehicle is formed by the joint flange and each of the coupling plate portions.

When each of the rear side members receives a load in a vehicle forward direction from the towing hitch and is thus displaced toward the front side, the lower back panel and the rear floor panel, which are joined to the rear side member, are also displaced toward the front side. At this time, as described above, displacement (a deformation amount) of the rear floor panel is larger than that of the lower back panel on which the frame member is disposed so as to extend. Due to the difference in the displacement, the wall plate panel of the lower back panel and the joint flange of the rear floor panel are displaced relative to each other, and the joint flange is pulled toward the front side of the vehicle with respect to the wall plate panel. At this time, a tensile load is applied to the bent portion, which is formed by the joint panel and the coupling plate portion, and the bent portion behaves to be stretched. Since the bent portion is projected toward the front side of the vehicle, due to stretching of the bent portion, a bent point is displaced (retreated) toward the rear side of the vehicle. Then, the joint flange returns toward the rear side of the vehicle by a retreated amount of the bent point. As a result, separation of the joint flange from the wall plate panel is suppressed, and the tensile load that is applied to the joint point, which joins the wall plate panel to the joint flange, is reduced.

A vehicle rear structure according to a second aspect of the disclosure includes rear side members, a lower back panel, and a rear floor panel. The rear side members extend in a vehicle front-rear direction and are configured such that a towing hitch member is coupled to rear ends of the rear side members. The lower back panel includes a wall plate panel, and is joined to the rear side members. The wall plate panel is erected and is configured such that a frame member extending in a vehicle width direction is disposed on the wall plate panel. The rear floor panel has a rear end in a shape extending along the wall plate panel. The rear floor panel includes a joint flange that is erected at the rear end of the rear floor panel and includes a joint point joined to the wall plate panel, joint portions each of which includes a joint point joined to a corresponding one of the rear side members, and coupling plate portions each of which is provided between the joint flange and a corresponding one of the joint portions so as to couple the joint flange to the joint portion. Each of the coupling plate portions includes a first plate portion that extends in a vehicle forward direction from the joint flange, and a second plate portion that extends in the vehicle width direction from the first plate portion and is connected to a corresponding one of the joint portions.

As described above, when each rear side member that receives a load in the vehicle forward direction from the towing hitch is displaced toward the front side, the wall plate panel of the lower back panel and the joint flange of the rear floor panel are displaced relative to each other, and the joint flange is pulled toward the front side of the vehicle with respect to the wall plate panel. At this time, a tensile load is applied to the coupling plate portion, and the coupling plate portion behaves such that a bent portion formed by the first plate portion and the second plate portion is stretched. Due to stretching of the bent portion, the bent point is displaced (retreated) toward the rear side of the vehicle. Then, the joint flange returns toward the rear side of the vehicle by a retreated amount of the bent point. As a result, separation of the joint flange from the wall plate panel is suppressed, and the tensile load that is applied to the joint point, which joins the wall plate panel to the joint flange, is reduced.

According to the above aspects of the disclosure, the load that is applied to the joint point between the lower back panel and the rear floor panel can be reduced to be smaller than that in the conventional vehicle rear structure without adding a reinforcing member.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
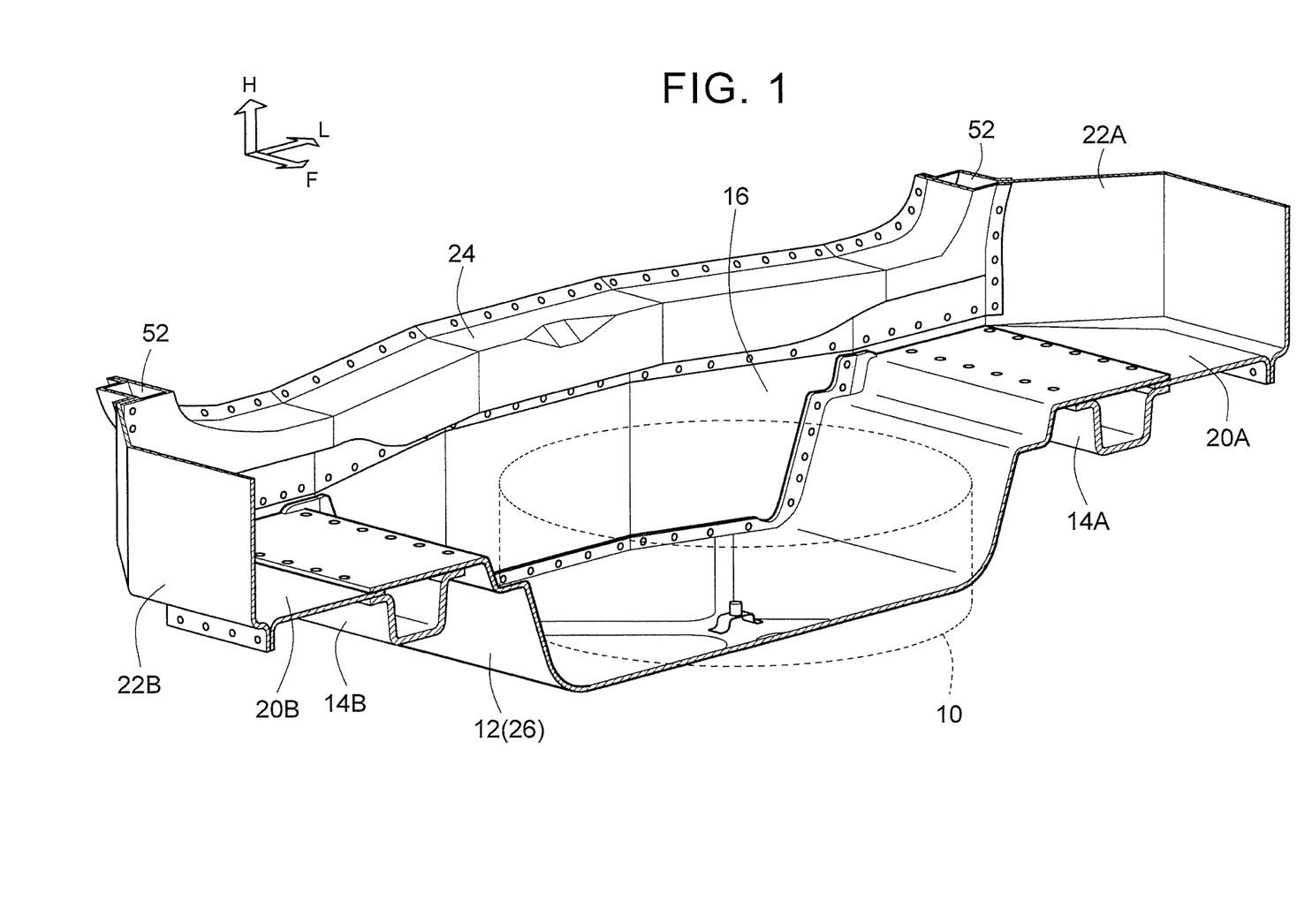
FIG. 1 is a perspective view that shows an example of a vehicle rear structure according to an embodiment.
Figure 2:
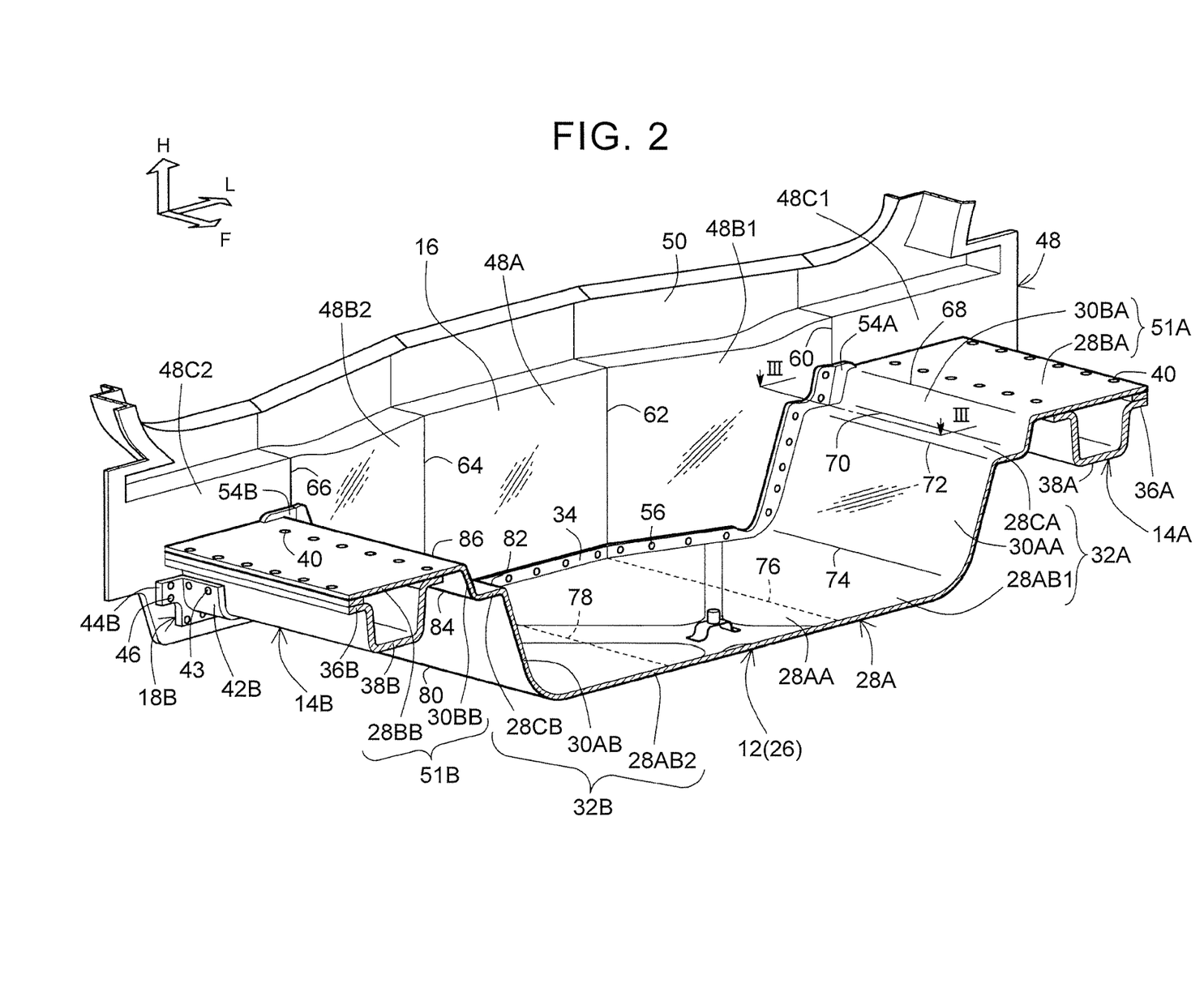
FIG. 2 is a perspective view that shows main members extracted from the vehicle rear structure according to the embodiment.
Figure 3:
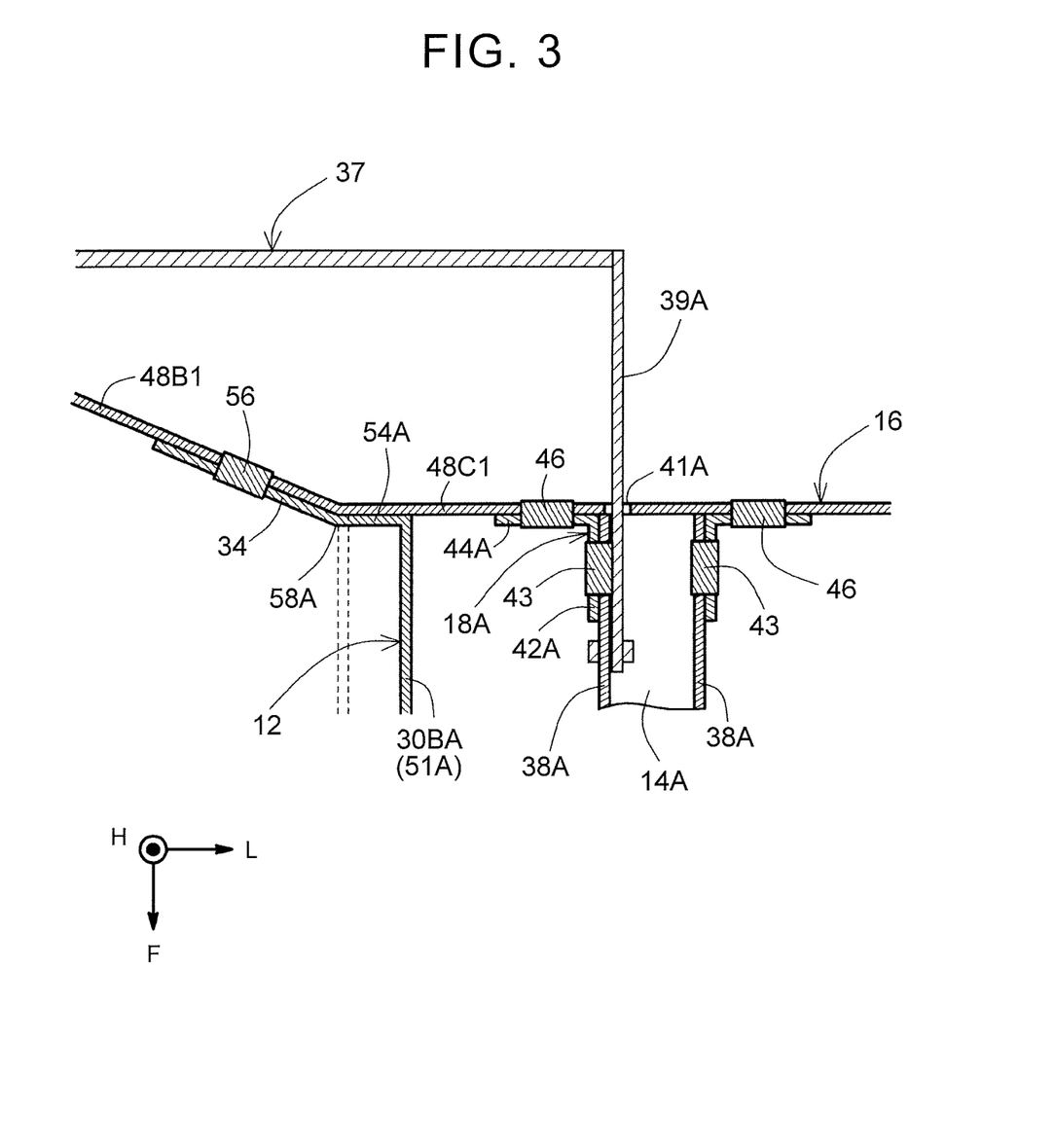
FIG. 3 is a sectional view that is taken along line III-III in FIG. 2.

FIG. 1 shows an example of a vehicle rear structure according to an embodiment. In FIG. 2, among components shown in FIG. 1, a rear floor panel 12, rear side members 14A, 14B, a lower back panel 16, and a bracket 18 (only 18B is shown) are extracted and shown. FIG. 3 is a sectional view that is taken along line III-III in FIG. 2.

In FIG. 1 to FIG. 9, the front side of a vehicle is indicated by an axis denoted by a symbol F (Front), and a vehicle width direction is indicated by an axis denoted by a symbol L (Left). As indicated by the symbol, a leftward direction when an occupant faces the front side of the vehicle is set as a positive direction of the L-axis. In addition, a vehicle height direction (a vertical direction) is indicated by an axis denoted by a symbol H (Height). As shown in FIG. 1, the F-axis, L-axis, and H-axis are orthogonal to each other. Hereinafter, a frame structure according to this embodiment will be appropriately described with reference to the three axes.

For example, a "front end" means an end of a given member in an F-axis positive direction, and a "rear end" means an end of a given member in an F-axis negative direction. An "inner width side" means a relatively vehicle center side in the L-axis direction (i.e., in a vehicle width direction), and an "outer width side" means a relatively vehicle outer side in the L-axis direction (i.e., in the vehicle width direction). An "upper side" means a relatively positive side in the H-axis direction, and a "lower side" means a relatively negative side in the H-axis direction.

The vehicle rear structure shown in FIG. 1 is a peripheral structure around an accommodation space for a spare tire 10, and the accommodation space is provided below a luggage room in a rear portion of the vehicle. This vehicle rear structure includes the rear floor panel 12, the rear side members 14A, 14B, the lower back panel 16, brackets 18A (see FIG. 3), 18B (see FIG. 2), rear floor side panels 20A, 20B, outer side members 22A, 22B, a lower back reinforcement (R/F) 24, and D pillars 52.

The rear floor side panels 20A, 20B are floor plate panels that are disposed on the outer width sides with respect to the rear side members 14A, 14B (i.e., the rear floor side panels 20A, 20B are disposed outside the rear side members 14A, 14B in the L-axis direction (in the vehicle width direction)). Outer edges at the outer width side portions of the rear floor side panels 20A, 20B (i.e., outer edges at the outer portions of the rear floor side panels 20A, 20B in the vehicle width direction) are connected to the outer side members 22A, 22B. Each of the outer side members 22A, 22B is erected in the vertical direction and constitutes a side wall of the luggage room.

Each of the rear side members 14A, 14B is a frame member that extends in a vehicle front-rear direction (the F-axis direction). Each of the rear side members 14A, 14B is provided in a side portion in the width direction around a rear wheel (not shown).

A section (an HL section) of each of the rear side members 14A, 14B that is perpendicular to the vehicle front-rear direction (the F-axis direction) has an upside-down hat shape. That is, joint flanges 36A, 36B, each of which corresponds to a brim of a hat, are disposed on the upper side (in the H-axis positive direction) with respect to frame portions 38A, 38B, each of which corresponds to a crown of the hat. The joint flanges 36A, 36B are joined to floor panels 28BA, 28BB (joint portions 51A, 51B) of the rear floor panel 12. Joining is carried out by spot welding or laser screw welding, for example, and a plurality of joint points 40 (weld points, nuggets) are formed in the joint flanges 36A, 36B and the floor panels 28BA, 28BB.

FIG. 3 shows only a towing hitch member 39A on one side and a peripheral structure around the towing hitch member 39A. Due to a symmetrical property of the structure, a towing hitch member 39B that is provided on an opposite side in the vehicle width direction and a peripheral structure around the towing hitch member 39B have a similar configuration. Note that a reference numeral and symbol with a comma in parentheses such as (, 14B) below indicates a component around the towing hitch member 39B. For comparison, a conventional side wall panel 30BA is indicated by broken lines.

A rear end of the rear side member 14A (, 14B) contacts (butts against) the lower back panel 16. A contact portion of the lower back panel 16 that contacts the rear side member 14A (, 14B) is provided with an insertion hole 41A (, 41B) through which the towing hitch member 39A (, 39B) corresponding to a bar of a towing hitch 37 can be inserted.

The towing hitch member 39A (, 39B) is inserted in the frame portion 38A (, 38B) of the rear side member 14A (, 14B) through the insertion hole 41A (, 41B) from a rear end of the frame portion 38A (, 38B), and is fixed to the frame portion 38A (, 38B) by a fastening member such as a bolt. In this way, the towing hitch 37 is coupled to the vehicle frame members including the rear side member 14A (, 14B) and thus can tow a trailer.

Referring to FIG. 2 and FIG. 3, the rear side members 14A, 14B and the lower back panel 16 are joined to each other via the brackets 18A, 18B. Note that, although the bracket 18A is not shown in FIG. 2, due to the symmetrical property of the structure, the bracket 18B and a peripheral structure around the bracket 18B have a similar configuration.

The brackets 18A, 18B include: first flanges 42A, 42B that contact the frame portions 38A, 38B of the rear side members 14A, 14B; and second flanges 44A, 44B that contact side portions 48C1, 48C2 of the lower back panel 16. When the frame portions 38A, 38B and the first flanges 42A, 42B are joined to each other, and the side portions 48C1, 48C2 and the second flanges 44A, 44B are joined to each other, the rear side members 14A, 14B and the lower back panel 16 are joined to each other via the brackets 18A, 18B.

Joining is carried out by spot welding or laser screw welding, for example. Joint points 43 (weld points, nuggets) are formed in the frame portions 38A, 38B and the first flanges 42A, 42B, and joint points 46 (weld points, nuggets) are formed in the side portions 48C1, 48C2 and the second flanges 44A, 44B.

The lower back panel 16 functions as a wall member of the accommodation space for the spare tire 10 and of the luggage room above the accommodation space. The lower back panel 16 includes a wall plate panel 48 and a reinforcing portion 50 that are erected in the vertical direction (the H-axis direction).

The reinforcing portion 50 is provided on top of the wall plate panel 48 and defines a closed cross section together with the lower back R/F 24 to increase rigidity. Each side of the reinforcing portion 50 in the vehicle width direction is connected to the D pillar 52 (see FIG. 1). By providing the lower back R/F 24 and D pillars 52 that are the frame members extending in the vehicle width direction, a deformation amount of the wall plate panel 48 in the lower back panel 16 is smaller than that of the rear floor panel 12 when the wall plate panel 48 receives a load from the towing hitch 37 as will be described below.

The wall plate panel 48 is formed so as to extend along a rear end shape of a floor plate portion 26 of the rear floor panel 12. As will be described below, on the basis of a diameter of the spare tire 10, a rear end of a central portion 28AA in the vehicle width direction of the floor plate portion 26 is provided behind (rearward of), in a vehicle front-rear direction (i.e., in the F-axis direction), the rear ends of the floor panels 28BA, 28BB on both sides. The floor plate portion 26 includes connecting portions 32A, 32B to connect the rear end of the central portion 28AA in the vehicle width direction and the rear ends of the floor panels 28BA, 28BB on both sides, and rear ends of the connecting portions 32A, 32B are tilted such that a distance between the rear ends of the connecting portions 32A, 32B increases in an upward direction in a plan view. The wall plate panel 48 is formed so as to extend along a rear end shape (profile) of the rear floor panel 12. More specifically, the wall plate panel 48 includes a central portion 48A in the vehicle width direction that contacts the rear end of the central portion 28AA of the rear floor panel 12 in the vehicle width direction; connecting portions 48B1, 48B2 that contact the rear ends of the connecting portions 32A, 32B of the rear floor panel 12; and the side portions 48C1, 48C2 that contact the rear ends of the floor panels 28BA, 28BB.

As shown in FIG. 2, the side portion 48C1 and the connecting portion 48B1 are separated by a ridgeline 60. The connecting portion 48B1 and the central portion 48A are separated by a ridgeline 62. The central portion 48A and the connecting portion 48B2 are separated by a ridgeline 64. The connecting portion 48B2 and the side portion 48C2 are separated by a ridgeline 66.

The rear floor panel 12 includes the floor plate portion 26 that constitutes a floor surface of the luggage room and the accommodation space for the spare tire 10 in the rear portion of the vehicle; and a joint flange 34 that is erected at a rear end of the floor plate portion 26. For example, the rear floor panel 12 that includes the floor plate portion 26 and the joint flange 34 is formed by pressing one steel plate. In order to secure the accommodation space for the spare tire 10, the floor plate portion 26 is configured such that a part of the floor plate portion 26 is recessed from the floor surface of the luggage room toward the lower side in the vertical direction.

In addition, the rear floor panel 12 (the floor plate portion 26) is formed such that the rear end thereof is shaped along the wall plate panel 48 of the lower back panel 16, and the rear floor panel 12 and the lower back panel 16 are joined to each other by the joint flange 34.

The floor plate portion 26 includes floor panels 28A, 28BA, 28BB, each of which extends in a horizontal direction (on an FL plane). The floor panel 28A serves as a floor plate in the accommodation space for the spare tire 10, and the floor panels 28BA, 28BB serve as floor plates in the luggage room.

The rear side members 14A, 14B extend below the floor panels 28BA, 28BB that are provided on both sides of the floor panel 28A. As described above, the floor panels 28BA, 28BB and the joint flanges 36A, 36B of the rear side members 14A, 14B are joined to each other, and the plurality of joint points 40 (the weld points, the nuggets) are formed.

As shown in FIGS. 1 and 2, in view of arrangement of the floor plate portion 26 and peripheral components, and the like, the floor plate portion 26 may be provided with floor panels 28CA, 28CB in addition to the floor panels 28A, 28BA, 28BB. In this case, the floor plate portion 26 includes a side wall panel 30AA that connects the floor panels 28A and 28CA that are located at different positions in the vertical direction; and a side wall panel 30BA that connects the floor panels 28CA and 28BA. Similarly, the floor plate portion 26 includes a side wall panel 30AB that connects the floor panels 28A and 28CB; and a side wall panel 30BB that connects the floor panels 28CB and 28BB. The side wall panels 30AA, 30AB, 30BA, 30BB are erected in the substantially vertical direction.

The rear floor panel 12 includes the joint portions 51A, 51B that include the joint points 40 joined to the rear side members 14A, 14B. For example, the joint portions 51A, 51B may include the floor panels 28BA, 28BB which are provided with the joint points 40 joined to the rear side members 14A, 14B, and the side wall panels 30BA, 30BB which are connected to the floor panels 28BA, 28BB. That is, in this embodiment, portions of the rear floor panel 12 that are displaced in substantial synchronization with the rear side members 14A, 14B at a time when each of the rear side members 14A, 14B receives the load in the vehicle front-rear direction may be regarded as the joint portions 51A, 51B. In other words, portions (the floor panels 28BA, 28BB) that include the joint points 40 joined to the rear side members 14A, 14B and portions (the side wall panels 30BA, 30BB) that are connected to the above-described portions (the floor panels 28BA, 28BB) and extend in parallel with the rear side members 14A, 14B may be regarded as the joint portions 51A, 51B.

As described above, the shape of the floor plate portion 26 is defined on the basis of a shape of the spare tire 10 that is accommodated thereon. In the embodiment shown in FIGS. 1 and 2, the spare tire 10 has the relatively large diameter, and thus the vehicle rear structure has a layout projected toward the rear side of the vehicle. Accordingly, the rear end of the central portion of the floor plate portion 26 in the vehicle width direction also has a shape projected toward the rear side of the vehicle.

That is, on the basis of the diameter of the spare tire 10, the rear end of the central portion 28AA of the floor plate portion 26 (the floor panel 28A) in the vehicle width direction extends toward the rear side of the vehicle as compared to the rear ends of the floor panels 28BA, 28BB that are side portions (both of side portions) of the floor plate portion 26 in the vehicle width direction. Because the rear end of the central portion 28AA in the vehicle width direction and the rear ends of the floor panels 28BA, 28BB that are the side portions are not aligned (i.e., are offset from each other), the connecting portions 32A, 32B are formed so as to connect the central portion 28AA and the floor panels 28BA, 28BB.

For example, the connecting portion 32A includes a side portion 28AB1 of the floor panel 28A, the side wall panel 30AA, and the floor panel 28CA. Similarly, the connecting portion 32B includes a side portion 28AB2 of the floor panel 28A, the side wall panel 30AB, and the floor panel 28CB.

Note that, as shown in FIG. 2, the floor panel 28BA and the side wall panel 30BA are separated by a ridgeline 68. The side wall panel 30BA and the floor panel 28CA are separated by a ridgeline 70. The floor panel 28CA and the side wall panel 30AA are separated by a ridgeline 72. The side wall panel 30AA and the side portion 28AB1 are separated by a ridgeline 74.

The side portion 28AB1 and the central portion 28AA are separated by an imaginary line 76. The imaginary line 76 is an imaginary line that crosses the ridgeline 62 and extends toward the front side of the vehicle (in the F-axis positive direction). The central portion 28AA and the side portion 28AB2 are separated by an imaginary line 78. The imaginary line 78 is an imaginary line that crosses the ridgeline 64 and extends toward the front side of the vehicle (in the F-axis positive direction).

The side portion 28AB2 and the side wall panel 30AB are separated by a ridgeline 80. The side wall panel 30AB and the floor panel 28CB are separated by a ridgeline 82. The floor panel 28CB and the side wall panel 30BB are separated by a ridgeline 84. The side wall panel 30BB and the floor panel 28BB are separated by a ridgeline 86.

Rear ends of the side portion 28AB1 of the floor panel 28A, the side wall panel 30AA, and the floor panel 28CA are formed in tilted shapes in the plan view such that the rear end of the central portion 28AA of the floor panel 28A in the vehicle width direction is connected to the rear ends of the side wall panel 30BA and the floor panel 28BA. Similarly, rear ends of the side portion 28AB2 of the floor panel 28A, the side wall panel 30AB, and the floor panel 28CB are formed in tilted shapes in the plan view such that the rear end of the central portion 28AA of the floor panel 28A in the vehicle width direction is connected to the rear ends of the side wall panel 30BB and the floor panel 28BB.

At the rear end (on a rear end ridgeline) of the floor plate portion 26, the joint flange 34 is provided to join the floor plate portion 26 to the lower back panel 16. The joint flange 34 is erected in the vertical direction (the H-axis direction) and is formed so as to face the lower back panel 16.

The joint flange 34 is formed so as to extend along the rear end of the floor plate portion 26. For example, the joint flange 34 is formed so as to extend along the central portion 28AA of the floor plate portion 26 in the vehicle width direction and the connecting portions 32A (the side portion 28AB1, the side wall panel 30AA, and the floor panel 28CA), 32B (the side portion 28AB2, the side wall panel 30AB, and the floor panel 28CB).

The joint flange 34 is formed so as to extend along the rear end of the floor plate portion 26. Similarly, the wall plate panel 48 of the lower back panel 16 is formed so as to extend along the rear end of the floor plate portion 26. Accordingly, when the rear end of the rear floor panel 12 contacts the wall plate panel 48 of the lower back panel 16, the joint flange 34 and the wall plate panel 48 face each other. In this state, the joint flange 34 is joined to the wall plate panel 48 of the lower back panel 16. For example, joining is carried out by spot welding or laser screw welding, and a plurality of joint points 56 (weld points, nuggets) are formed in the joint flange 34 and the wall plate panel 48.

The rear floor panel 12 is provided with coupling plate portions 54A, 54B between the joint flange 34 and the joint portions 51A, 51B. The coupling plate portions 54A, 54B are members that couple the joint flange 34 to the joint portions 51A, 51B. As shown in FIG. 2 and FIG. 3, the coupling plate portions 54A, 54B extend from outer width ends of the joint flange 34 and are coupled to the side wall panels 30BA, 30BB of the joint portions 51A, 51B. The coupling plate portions 54A, 54B are not joined to (do not have joint points joined to) the lower back panel 16, and are not joined to (do not have joint points joined to) the rear side members 14A, 14B. Thus, the coupling plate portions 54A, 54B are not fixed to the lower back panel 16 and not fixed to the rear side members 14A, 14B.

As shown in FIG. 3, the coupling plate portion 54A (, 54B) is bent with respect to the joint flange 34. More specifically, the coupling plate portion 54A (, 54B) extends to be tilted toward the rear side of the vehicle from an extending direction of the joint flange 34 in the plan view. That is, a bent portion 58A (, 58B) that is projected toward the front side of the vehicle is formed by the joint flange 34 and the coupling plate portion 54A (, 54B).

Referring to FIG. 2, for example, the joint flange 34 is formed so as to extend along the rear ends of the central portion 28AA in the vehicle width direction and the connecting portions 32A, 32B in the rear floor panel 12. In addition, the coupling plate portions 54A, 54B are formed so as to extend along the rear ends of the floor panels 28BA, 28BB that are both of the side portions of the rear floor panel 12. In the configuration, the coupling plate portions 54A, 54B are disposed in a so-called front-back surface direction such that the coupling plate portions 54A, 54B are parallel to the vehicle width direction (an L-axis direction), in other words, perpendicular to the vehicle front-rear direction (the F-axis direction).

Figure 4:
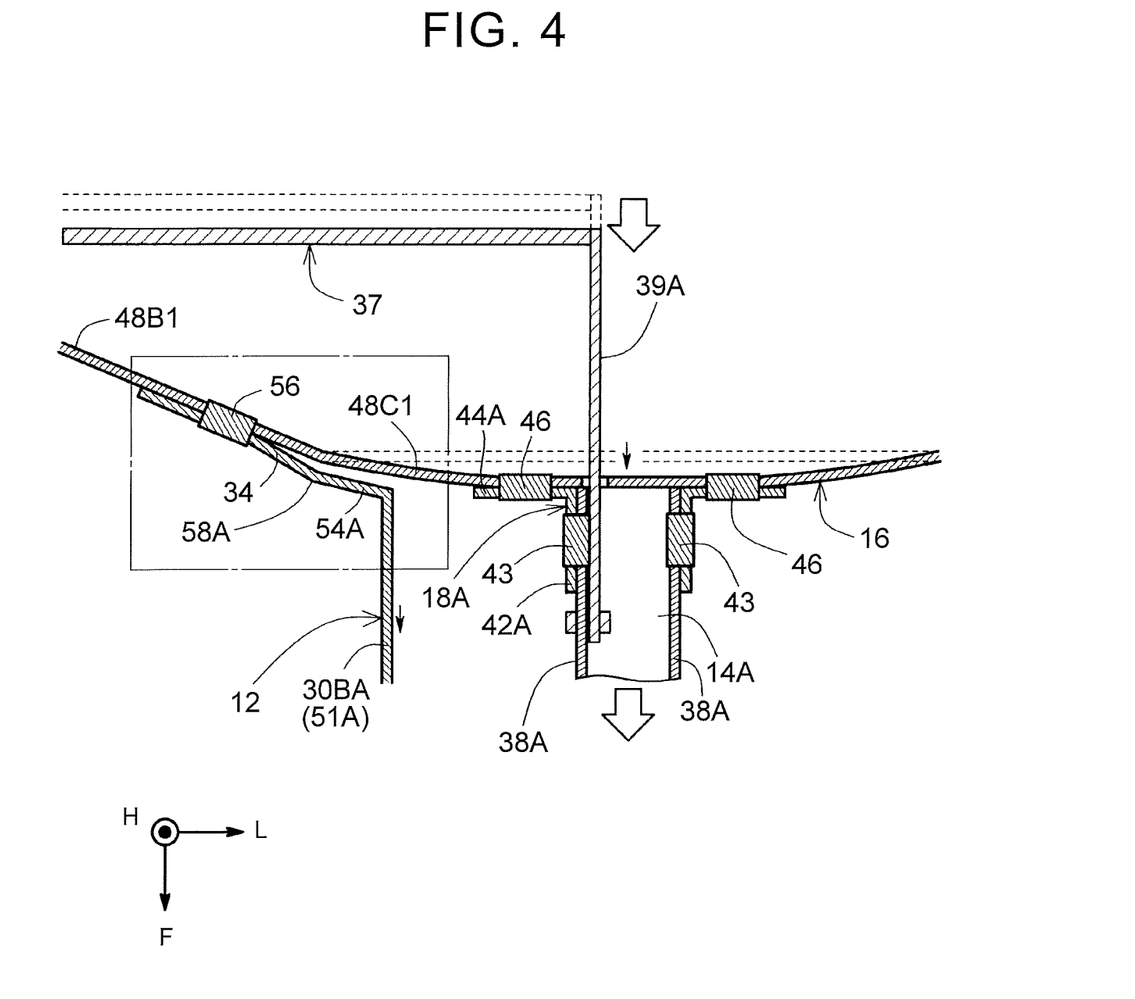
FIG. 4 is a view that shows behavior of peripheral members at a time when a rear side member receives a load in FIG. 3.

In the vehicle rear structure according to this embodiment, by providing the coupling plate portions 54A, 54B, a tensile load that is applied to each of the joint points 56 in the joint flange 34 is reduced, and the joint points 56 can be prevented from being separated from the wall plate panel 48. FIG. 4 shows an example in which the rear side member 14A receives a load in a vehicle forward direction (the F-axis positive direction) from the towing hitch 37. Note that, due to the symmetrical property of the structure, the rear side member 14B and the peripheral structure around the rear side member 14B have a similar configuration.

When the load is input, the rear side member 14A (, 14B) is displaced toward the front side of the vehicle. Consequently, the portions that are joined to the rear side member 14A (, 14B) are also displaced toward the front side of the vehicle. More specifically, the side portion 48C1 (, 48C2) of the lower back panel 16, which is joined to the rear side member 14A (, 14B) via the bracket 18A (, 18B), is bent (deformed) toward the front side of the vehicle due to elasticity thereof.

In addition, the joint portion 51A (, 51B) that is joined to the rear side member 14A (, 14B), that is, the floor panel 28BA (, 28BB) and the side wall panel 30BA (, 30BB) are displaced toward the front side of the vehicle together with the rear side member 14A (, 14B). As described above, since the joint portion 51A (, 51B) extends in parallel with a load direction, the joint portion 51A (, 51B) is basically displaced without being subjected to bending deformation. Furthermore, the coupling plate portion 54A (, 54B), which is connected to the side wall panel 30BA (, 30BB), and the joint flange 34, which is connected to the coupling plate portion 54A (, 54B), are displaced (pulled) toward the front side of the vehicle.

Here, with regard to the displacement of the joint flange 34, as described above, the lower back R/F 24 and the D pillars 52 that are the frame members extending in the vehicle width direction are provided on top of the wall plate panel 48 of the lower back panel 16, and the deformation amount of the wall plate panel 48 is smaller than that of the rear floor panel 12 when the wall plate panel 48 receives the load from the towing hitch 37. Accordingly, when receiving the load from the towing hitch 37, the joint flange 34 of the rear floor panel 12 and the connecting portion 48B1 (, 48B2) of the lower back panel 16 are displaced relative to each other. More specifically, the joint flange 34 is pulled toward the front side of the vehicle with respect to the connecting portion 48B1 (, 48B2). At this time, the joint flange 34 is displaced (rotated) around the joint points 56 so as to separate from the connecting portion 48B1 (, 48B2) of the lower back panel 16.

Figure 5:
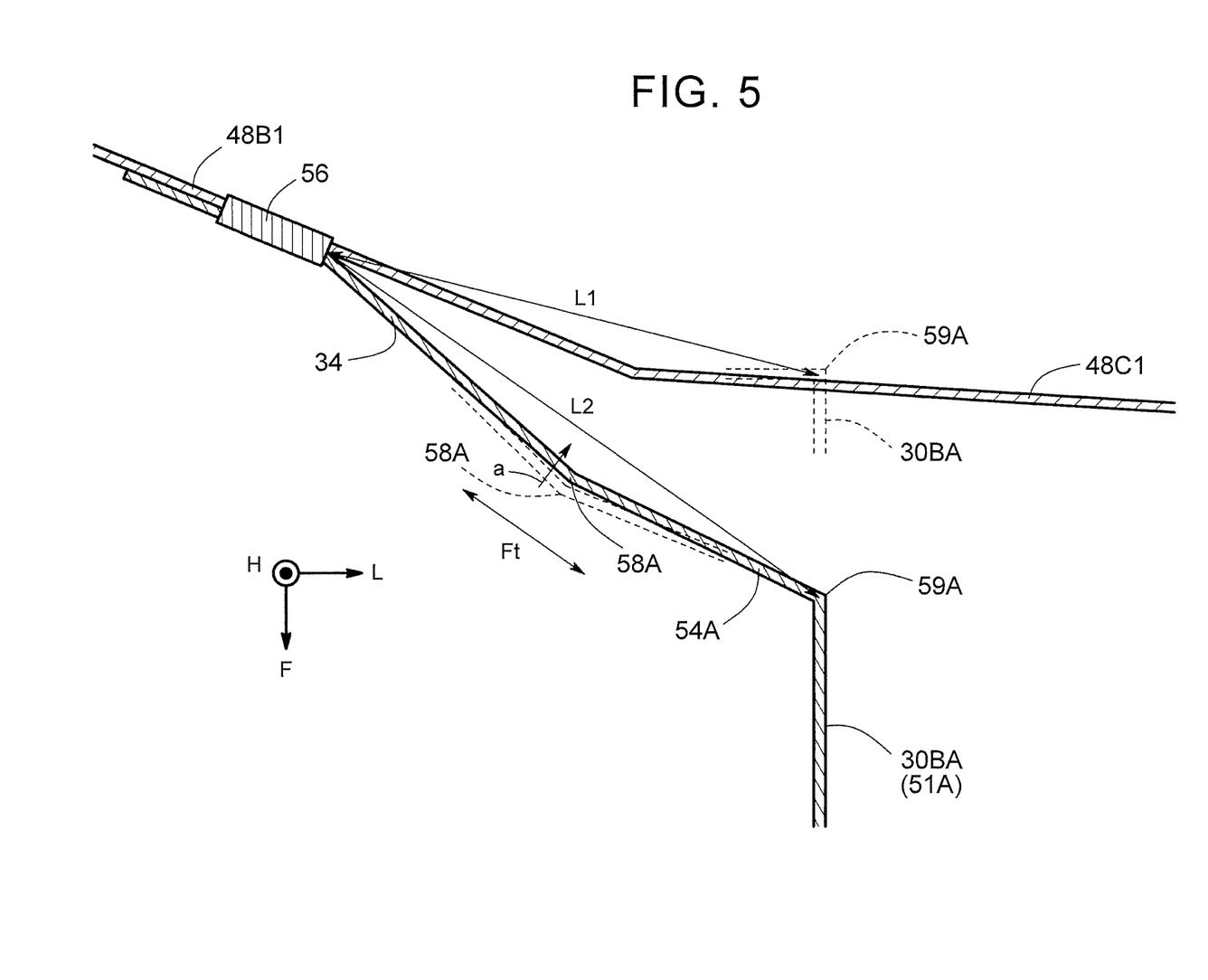
FIG. 5 is an enlarged view of a part that is indicated by alternate long and short dash lines in FIG. 4.

FIG. 5 is an enlarged view that shows a part indicated by alternate long and short dash lines in FIG. 4. Due to the displacement of the joint portion 51A (, 51B) toward the front side of the vehicle, a distance between the joint point 56 and a rear end 59A (, 59B) of the joint portion 51A (, 51B) is increased from L1 to L2. Accordingly, a tensile load Ft is applied to the bent portion 58A (, 58B) formed by the coupling plate portion 54A (, 54B) and the joint flange 34, which connect the joint point 56 and the rear end 59A (, 59B) of the joint portion 51A (, 51B). When the tensile load Ft is applied to the bent portion 58A (, 58B), the bent portion 58A (, 58B) is stretched (extended). At this time, since the bent portion 58A (, 58B) is formed to be projected toward the front side of the vehicle, a bent point as an apex is displaced (retreated) toward the rear side of the vehicle as indicated by an arrow "a", due to stretching of the bent portion 58A (, 58B). Then, the joint flange 34 returns toward the rear side of the vehicle by a retreated amount of the bent point. That is, separation of the joint flange 34 from the wall plate panel 48 is suppressed by the stretching of the bent portion 58A (, 58B), and accordingly, stress applied to the joint point 56 is reduced. As a result, the tensile load that is applied to the joint point 56 is reduced, and the joint point 56 is prevented from being separated from the wall plate panel 48.

A vehicle rear structure according to another example of the embodiment will be described. In the embodiment according to FIG. 1 to FIG. 5, the joint flange 34 extends obliquely with respect to the vehicle width direction (the L-axis direction), and the coupling plate portions 54A, 54B extend in parallel with the vehicle width direction. In this way, the bent portions 58A, 58B are formed. However, the disclosure is not limited to this embodiment. For example, the bent portions 58A, 58B may be formed by forming the coupling plate portions 54A, 54B having a multi-step folding structure.

Figure 6:
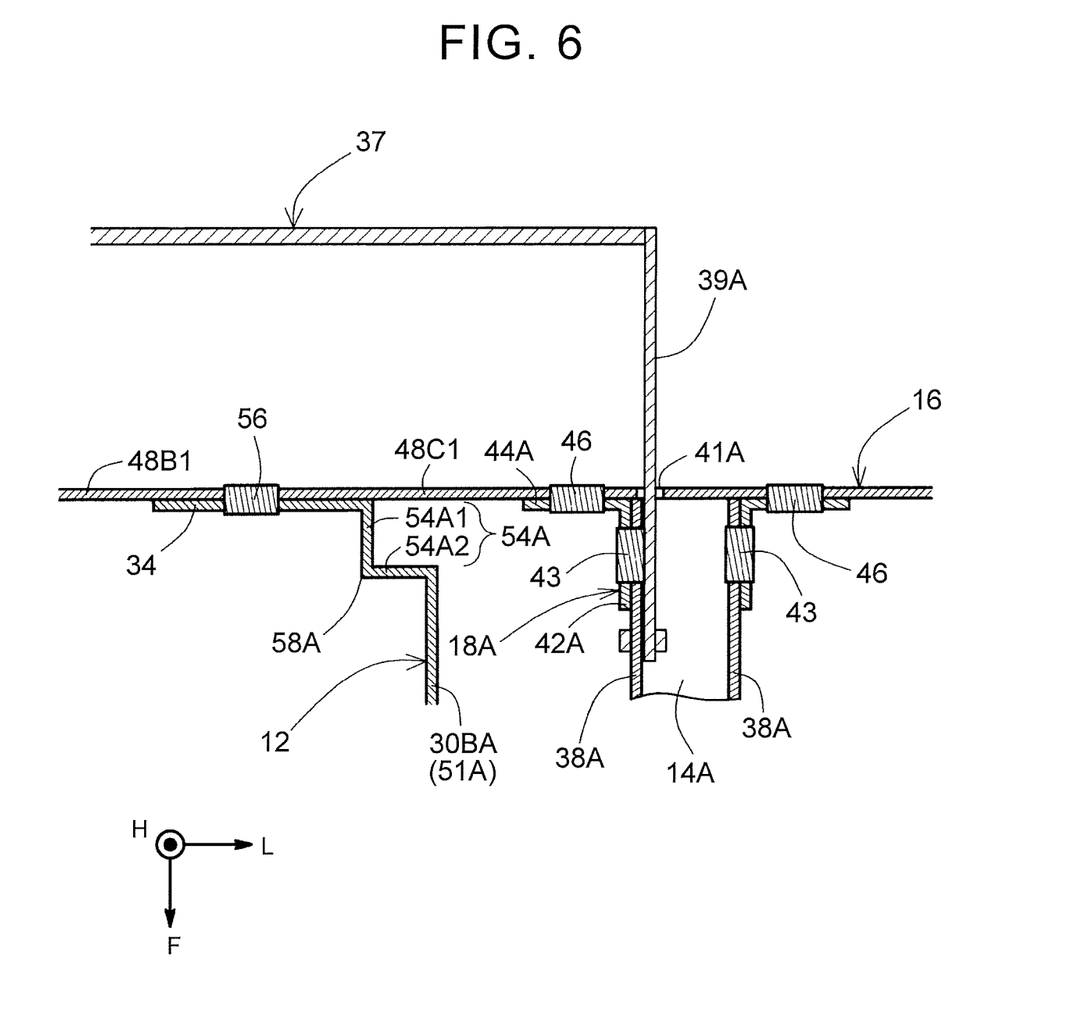
FIG. 6 is a plan sectional view that shows a vehicle rear structure according to another example of the embodiment.

FIG. 6 shows a modified example of the plan section that is taken along line III-III in FIG. 2. Note that, due to the symmetrical property of the structure, FIG. 6 shows only the rear side member 14A and a peripheral structure around the rear side member 14A, and the rear side member 14B and the peripheral components that have the similar structure are not shown. In addition, the reference numeral and symbol with the comma in the parentheses such as (, 14B) below indicates a component around the rear side member 14B.

As shown in this drawing, the lower back panel 16 extends in parallel with the vehicle width direction (the L-axis direction) in the plan view. The joint flange 34 of the rear floor panel 12 also extends in parallel with the vehicle width direction (the L-axis direction) along the lower back panel 16. The side wall panel 30BA (, 30BB), which constitutes a part of the joint portion 51A (, 51B), extends in parallel with the vehicle front-rear direction (the F-axis direction) along the rear side member 14A (, 14B).

The coupling plate portion 54A (, 54B) connects the joint flange 34 and the side wall panel 30BA (, 30BB). As shown in FIG. 6, the coupling plate portion 54A (, 54B) includes a first plate portion 54A1 (, 54B1) that extends in the vehicle forward direction (the F-axis positive direction) from the joint flange 34; and a second plate portion 54A2 (, 54B2) that extends in the vehicle width direction (the L-axis positive direction) from the first plate portion 54A1 (, 54B1) and is connected to the side wall panel 30BA (, 30BB). The bent portion 58A (, 58B) that is projected obliquely toward the front side of the vehicle is formed by the first plate portion 54A1 (, 54B1) and the second plate portion 54A2 (, 54B2).

In this structure, when the rear side member 14A (, 14B) receives the load from the towing hitch 37, as described above, the joint flange 34 of the rear floor panel 12 and the connecting portion 48B1 (, 48B2) of the lower back panel 16 are displaced relative to each other. At the time, the tensile load Ft is applied to the bent portion 58A (, 58B), which is formed in the coupling plate portion 54A (, 54B) coupling the joint point 56 and the joint portion 51A (, 51B). When the tensile load Ft is applied to the bent portion 58A (, 58B), the bent portion 58A (, 58B) is stretched (extended). At this time, since the bent portion 58A (, 58B) is formed to be projected obliquely toward the front side of the vehicle, the bent point as the apex is displaced (retreated) toward the rear side of the vehicle due to stretching of the bent portion 58A (, 58B). Then, the joint flange 34 returns toward the rear side of the vehicle by the retreated amount of the bent point. That is, separation of the joint flange 34 from the wall plate panel 48 is suppressed by the stretching of the bent portion 58A (, 58B), and accordingly, the stress applied to the joint point 56 is reduced. As a result, the tensile load that is applied to the joint point 56 is reduced, and the joint point 56 is prevented from being separated from the wall plate panel 48.

What is claimed is:

1. A vehicle rear structure comprising:
rear side members that extend in a vehicle front-rear direction and are configured such that a towing hitch member is coupled to a rear end of each rear side member;
a lower back panel that includes a wall plate panel, and is joined to the rear side members, the wall plate panel being erected and being configured such that a frame member extending in a vehicle width direction is disposed on the wall plate panel; and
a rear floor panel having a rear end in a shape extending along the wall plate panel, the rear floor panel including a joint flange that is erected at the rear end of the rear floor panel and includes a joint point joined to the wall plate panel, joint portions each of which includes a joint point joined to a corresponding one of the rear side members, and coupling plate portions each of which is provided between the joint flange and a corresponding one of the joint portions so as to couple the joint flange to the joint portion, wherein:
a rear end of a central portion of the rear floor panel in the vehicle width direction is provided behind, in the vehicle front-rear direction, rear ends of both of side portions of the rear floor panel in the vehicle width direction;
a connecting portion is provided between the central portion of the rear floor panel and each of the side portions of the rear floor panel such that a rear end of the connecting portion is tilted in a plan view so as to connect the central portion and the side portion;
the joint flange is provided to extend along the rear ends of the central portion and the connecting portion, each of the coupling plate portions is provided to extend along the rear end of a corresponding one of the side portions, and a bent portion that is projected toward a front side of the vehicle is formed by the joint flange and each of the coupling plate portions; and
at least one of the joint portions is integrated with at least one of the coupling plate portions.

2. A vehicle rear structure comprising:
rear side members that extend in a vehicle front-rear direction and are configured such that a towing hitch member is coupled to a rear end of each rear side member;
a lower back panel that includes a wall plate panel, and is joined to the rear side members, the wall plate panel being erected and being configured such that a frame member extending in a vehicle width direction is disposed on the wall plate panel; and
a rear floor panel having a rear end in a shape extending along the wall plate panel, the rear floor panel including a joint flange that is erected at the rear end of the rear floor panel, and includes a joint point joined to the wall plate panel, joint portions each of which includes a joint point joined to a corresponding one of the rear side members, and coupling plate portions each of which is provided between the joint flange and a corresponding one of the joint portions so as to couple the joint flange to the joint portion, wherein
each of the coupling plate portions includes a first plate portion that extends in a vehicle forward direction from the joint flange, and a second plate portion that extends in the vehicle width direction from the first plate portion and is connected to a corresponding one of the joint portions, and
at least one of the joint portions is integrated with at least one of the coupling plate portions.

3. The vehicle rear structure according to claim 1, wherein the bent portion is provided forward of the joint flange in the vehicle front-rear direction.

4. The vehicle rear structure according to claim 2, wherein a bent portion is provided between the first plate portion and the second plate portion, and the bent portion is provided forward of the joint flange in the vehicle front-rear direction.

* * * * *